(12) United States Patent
Kimura (10) Patent No.: US 8,242,889 B2
(45) Date of Patent: Aug. 14, 2012

(54) RFID TAG

(75) Inventor: Shigekazu Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 12/382,679

(22) Filed: Mar. 20, 2009

(65) Prior Publication Data

US 2009/0309705 A1  Dec. 17, 2009

(30) Foreign Application Priority Data

Jun. 13, 2008 (JP) ................. 2008-155816

(51) Int. Cl.
*H04Q 5/22* (2006.01)

(52) U.S. Cl. .................................... 340/10.34

(58) Field of Classification Search ............. 340/10.34, 340/10.5, 10.4, 572.3, 572.4
See application file for complete search history.

(56) References Cited

U.S. PATENT DOCUMENTS

| | | | |
|---|---|---|---|
| 5,225,667 A | | 7/1993 | Furuta et al. |
| 6,282,407 B1 * | | 8/2001 | Vega et al. ............ 455/41.1 |
| 6,879,809 B1 | | 4/2005 | Vega et al. |
| 2003/0104848 A1 | | 6/2003 | Brideglall |
| 2003/0178483 A1 | | 9/2003 | Wakabayashi |
| 2007/0285246 A1 | | 12/2007 | Koyama |
| 2008/0143531 A1 | | 6/2008 | Tadokoro |

FOREIGN PATENT DOCUMENTS

| | | |
|---|---|---|
| EP | 1 327 958 | 7/2003 |
| GB | 2 292 86 6 | 3/1996 |
| JP | 5-67254 | 3/1993 |
| JP | 8-69513 | 3/1996 |
| JP | 2005-351877 | 12/2005 |
| WO | 2007/139205 | 12/2007 |

OTHER PUBLICATIONS

European Search Report for corresponding European Application 09155828.8-2210; dated Aug. 12, 2009.

* cited by examiner

*Primary Examiner* — Vernal Brown
(74) *Attorney, Agent, or Firm* — Staas & Halsey LLP (57) ABSTRACT

A radio-frequency identification (RFID) tag includes a battery that stores therein electricity and supplies the electricity to the RFID tag, an antenna that receives radio waves transmitted from a reader/writer, an electricity generating unit that generates electricity based on the radio waves received by the antenna, and supplies the electricity to the RFID tag, an electricity storage determining unit that determines whether electricity is stored in the battery, an electricity supply switching control unit that, when the electricity storage determining unit determines that electricity is stored, selects a connection of a circuit to operate the RFID tag with the electricity supplied from the battery, and an electricity generating unit switching control unit that, when the electricity storage determining unit determines that electricity is stored, selects a connection of a circuit not to input the radio waves received by the antenna to the electricity generating unit.

7 Claims, 10 Drawing Sheets

RFID TAG

CROSS-REFERENCE TO RELATED APPLICATION(S)

This application is based upon and claims the benefit of priority of the prior Japanese Patent Application No. 2008-155816, filed on Jun. 13, 2008, the entire contents of which are incorporated herein by reference.

FIELD

The embodiments discussed herein are directed to technology related to a radio-frequency identification (RFID) tag.

BACKGROUND

Recently, an RFID tag is used in various scenes such as a distribution management system, a user authentication system, an electronic money system, or a transportation system. The RFID tag houses a small-sized integrated circuit (IC) chip together with an antenna in its housing having a card shape or the like, and is for reading and writing information from and in a reader/writer through radio waves without contact. Technologies related with the RFID tag are described, for example, in Japanese Laid-open Patent Publication No. 05-67254, Japanese Laid-open Patent Publication No. 08-69513, and Japanese Laid-open Patent Publication No. 2005-351877.

There is an RFID tag called a passive tag that does not include a built-in battery, and uses radio waves sent from a reader/writer as an electricity source of an IC chip. The passive tag can be operated semipermanently, and thus is used in various systems.

However, the conventional passive tag has a problem that the distance within which the passive tag can communicate with a reader/writer is short. Specifically, because the conventional passive tag generates operating electricity based on radio waves received from a reader/writer, the passive tag cannot be operated unless it is within a range that the passive tag can receive radio waves with the electricity necessary in generating operating electricity. In other words, the conventional passive tag can be operated only near a reader/writer because the passive tag needs to receive radio waves with sufficiently large electricity.

SUMMARY

According to one aspect of the invention, a radio-frequency identification (RFID) tag includes a battery that stores therein electricity and supplies the electricity to the RFID tag, an antenna that receives radio waves transmitted from a reader/writer, an electricity generating unit that generates electricity based on the radio waves received by the antenna, and supplies the electricity to the RFID tag, an electricity storage determining unit that determines whether electricity is stored in the battery, an electricity supply switching control unit that, when the electricity storage determining unit determines that electricity is stored, selects a connection of a circuit to operate the RFID tag with the electricity supplied from the battery, and an electricity generating unit switching control unit that, when the electricity storage determining unit determines that electricity is stored, selects a connection of a circuit not to input the radio waves received by the antenna to the electricity generating unit.

According to another aspect of an embodiment, a radio-frequency identification (RFID) tag includes a battery that stores therein electricity and supplies the electricity to the RFID tag, an antenna that receives radio waves transmitted from a reader/writer, a demodulating unit that demodulates the radio waves received by the antenna, an electricity generating unit that generates electricity based on the radio waves received by the antenna, and supplies the electricity to the RFID tag, an amplifier that amplifies the radio waves received by the antenna, and inputs resultant radio waves to the demodulating unit, an electricity storage determining unit that determines whether electricity is stored in the battery, an electricity supply switching control unit that, when the electricity storage determining unit determines that electricity is stored, selects a connection of a circuit to operate the RFID tag with the electricity supplied from the battery, and an amplifier switching control unit that, when the electricity storage determining unit determines that electricity is stored, selects a connection of a circuit to input the radio waves received by the antenna to the demodulating unit through the amplifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Exemplary embodiments of an RFID tag according to the present invention will be explained in detail with reference to drawings. In the following, an example in which the RFID tag according to the present invention is applied to a passive tag will be explained, but the RFID tag according to the present invention can be applied to a non-contact IC recording medium other than a passive tag.

[a] First Embodiment

Figure 13:
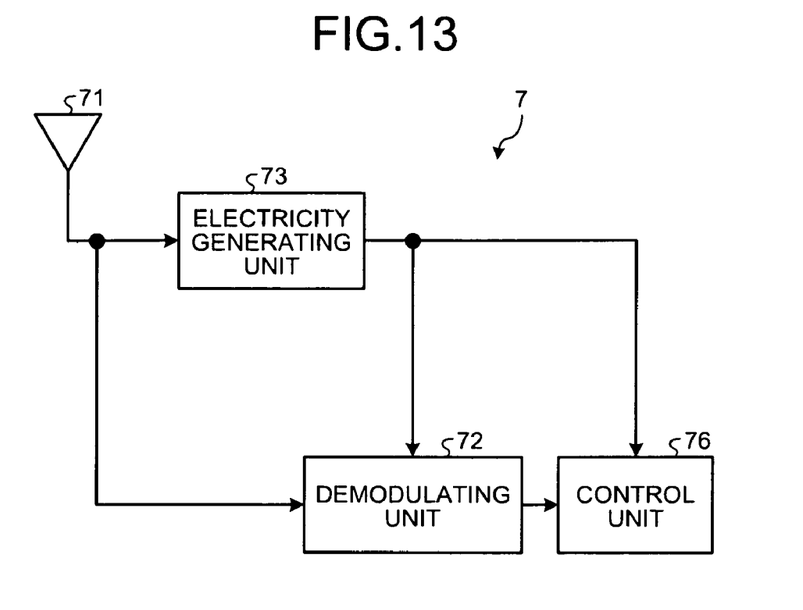
FIG. 13 is a schematic of a circuit for a conventional passive tag.

A conventional passive tag will be explained to clarify characteristics of a passive tag according to a first embodiment. FIG. 13 is a schematic for explaining a circuit for a conventional passive tag 7. As depicted in FIG. 13, the passive tag 7 includes an antenna 71, a demodulating unit 72, an electricity generating unit 73, and a control unit 76.

The antenna 71 receives radio waves transmitted from a reader/writer (not shown), and outputs the received radio waves to the demodulating unit 72 and the electricity generating unit 73. The electricity of radio waves output by the antenna 71 to the demodulating unit 72 and the electricity generating unit 73 is split at a predetermined ratio. In the embodiment, it is assumed that the ratio of the electricity of radio waves output by the antenna 71 to the demodulating unit 72 and the electricity generating unit 73 is 2:3. For example, when the antenna 71 receives radio waves with the electricity of 10 milliwatts, the antenna 71 outputs radio waves with the electricity of 4 milliwatts to the demodulating unit 72, and outputs radio waves with the electricity of 6 milliwatts to the electricity generating unit 73.

The demodulating unit 72 is a processing unit that demodulates radio waves input from the antenna 71. The demodulating unit 72 can demodulate input radio waves with a predetermined electricity or higher. In the present embodiment, it is assumed that the electricity of radio waves that are demodulated by the demodulating unit 72 needs to be 10 milliwatts or higher. In other words, when the antenna 71 receives radio waves with the electricity of 25 milliwatts or higher, the demodulating unit 72 can demodulate the radio waves. This is because when the antenna 71 receives radio waves with the electricity of 25 milliwatts, radio waves with the electricity of 10 milliwatts that are obtained by multiplying 25 milliwatts by "2/5" are input to the demodulating unit 72.

The electricity generating unit 73 is a processing unit that generates the electricity based on radio waves input from the antenna 71, and supplies the generated electricity to the demodulating unit 72 and the control unit 76. The electricity generating unit 73 can generate the electric power for operating the demodulating unit 72 and the control unit 76 when radio waves with a predetermined electricity or higher are input. In the present embodiment, the electricity of radio waves that is necessary for the electricity generating unit 73 to generate the electricity for operating the demodulating unit 72 and the control unit 76 is 18 milliwatts or higher. In other words, when the antenna 71 receives radio waves with the electricity of 30 milliwatts or higher, the electricity generating unit 73 can generate the electricity for operating the demodulating unit 72 and the control unit 76. This is because when the antenna 71 receives radio waves with the electricity of 30 milliwatts, radio waves with the electricity of 18 milliwatts that are obtained by multiplying 30 milliwatts by "3/5" are input to the electricity generating unit 73.

The control unit 76 controls entire operation of the passive tag 7. For example, the control unit 76 performs processing of sending a tag ID or controlling reading or writing of data from or in a storage unit (not shown) based on various commands included in radio waves transmitted from a reader/writer.

Figure 14:
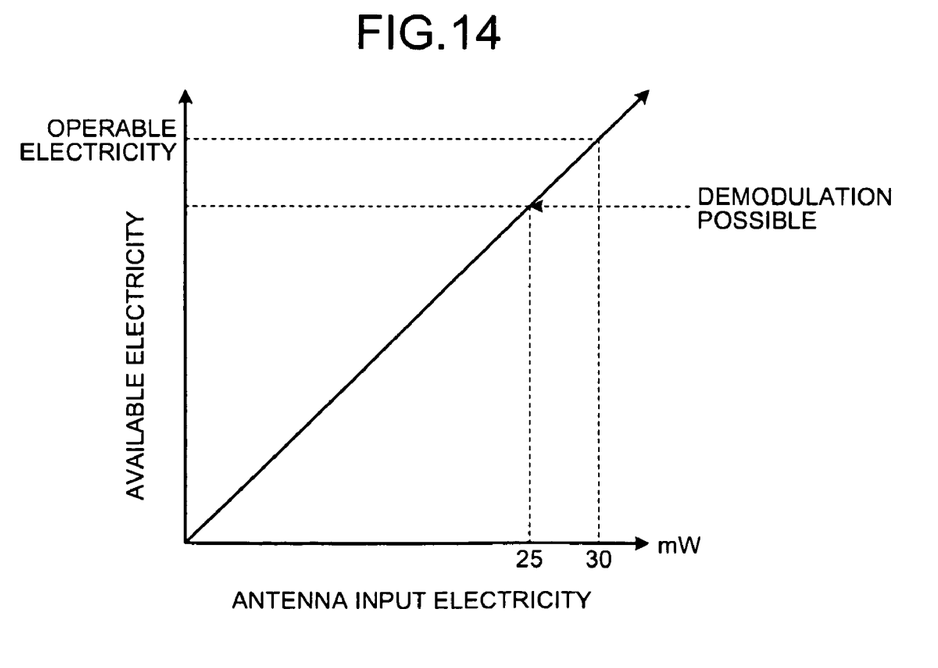
FIG. 14 is a graph of an example of relationship between the antenna input electricity and the available electricity of the passive tag shown in FIG. 13.

Using FIG. 14, relationship between the electricity of radio waves received by the antenna 71 (hereinafter, "antenna input electricity") and the electricity supplied to the demodulating unit 72 and the control unit 76 (hereinafter, "available electricity") will be explained. FIG. 14 is a graph of an example of the relationship between the antenna input electricity and the available electricity of the passive tag 7 illustrated in FIG. 13.

As depicted in FIG. 14, when the antenna input electricity reaches 25 milliwatts, the demodulating unit 72 can demodulate the radio waves, but cannot operate the passive tag 7. This is because the electricity generated by the electricity generating unit 73 does not reach the electricity that can operate the passive tag 7 (hereinafter, the electricity that can operate the passive tag is called "operable electricity"). In order for the passive tag 7 to communicate with the reader/writer, the demodulating unit 72 needs to be able to demodulate received radio waves, and the electricity generating unit 73 needs to be able to generate the operable electricity. Accordingly, when the antenna input electricity is 25 milliwatts, the passive tag 7 cannot communicate with the reader/writer. On the other hand, as depicted in FIG. 14, when the antenna input electricity reaches 30 milliwatts, the electricity generated by the electricity generating unit 73 reaches the operable electricity, and thus the passive tag 7 can communicate with the reader/writer. As depicted in FIG. 14, the electricity of radio waves that is necessary in generating the operable electricity is generally larger than the electricity of radio waves that is necessary in demodulation.

As can be seen, the conventional passive tag 7 cannot be operated unless the antenna input electricity becomes 30 milliwatts or higher. In other words, the passive tag 7 cannot be operated unless the passive tag 7 is within a distance from a reader/writer that is short enough to receive radio waves with the electricity of 30 milliwatts or higher. For this reason, the conventional passive tag 7 has a problem that the distance within which the passive tag 7 can communicate with a reader/writer is short.

As a solution to the problem, there is a configuration in which a battery is built in a passive tag, and electricity is supplied from the battery when processing of receiving radio waves is performed. The passive tag having a built-in battery will be explained using FIG. 15. In the present embodiment, the passive tag having a built-in battery is called a "battery-assisted tag".

Figure 15:
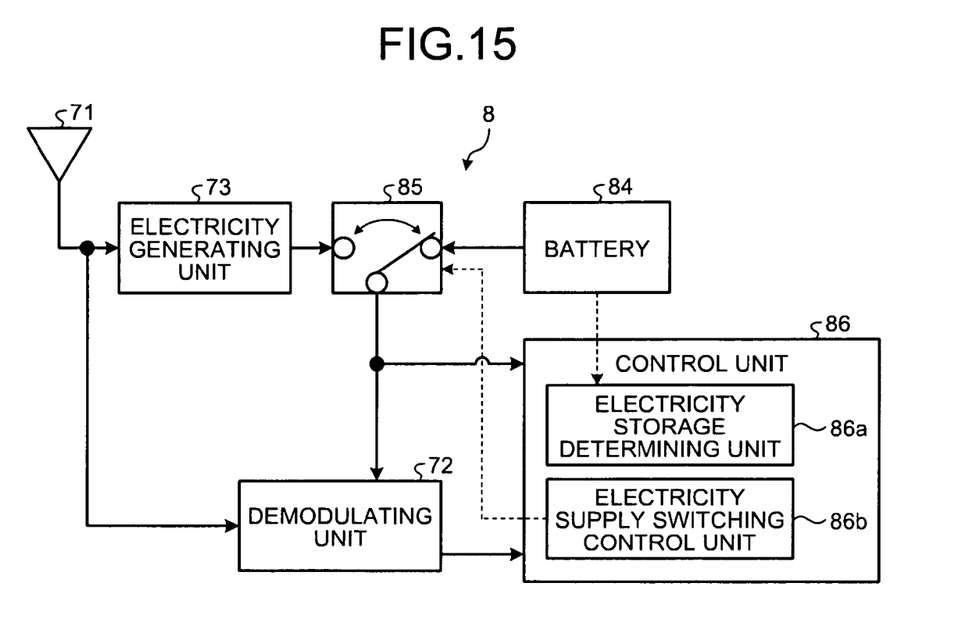
FIG. 15 is a schematic of a circuit for a battery-assisted tag.

FIG. 15 is a schematic of a circuit for a battery-assisted tag 8. In the following, units having the same functions as those of other units that are already described are provided with the same numerals, and their detailed explanation is not repeated. As depicted in FIG. 15, the battery-assisted tag 8 includes the antenna 71, the demodulating unit 72, the electricity generating unit 73, a battery 84, an electricity supply selector 85, and a control unit 86.

The battery 84 is a device that supplies electricity stored therein to the demodulating unit 72 and the control unit 86. The electricity supply selector 85 is a switch that selects a connection such that the device that supplies electricity to the demodulating unit 72 and the control unit 86 is either the electricity generating unit 73 or the battery 84.

The control unit 86 controls entire operation of the battery-assisted tag 8, and includes an electricity storage determining unit 86a and an electricity supply switching control unit 86b. The electricity storage determining unit 86a is a processing unit that regularly determines whether electricity is stored in the battery 84. For example, the electricity storage determining unit 86a determines whether electricity is stored in the battery 84 by measuring the current flowing in the battery 84.

The electricity supply switching control unit 86b is a processing unit that instructs the electricity supply selector 85 to select a connection based on the result of electricity storage determination processing by the electricity storage determining unit 86a. Specifically, the electricity supply switching control unit 86b selects a connection of the electricity supply selector 85 to supply electricity from the battery 84 when the electricity storage determining unit 86a determines that electricity is stored in the battery 84. On the other hand, the electricity supply switching control unit 86b selects a connection of the electricity supply selector 85 to supply electricity from the electricity generating unit 73 when the electricity storage determining unit 86a determines that electricity is not stored in the battery 84.

With this configuration, the battery-assisted tag 8 can be operated with electricity supplied from the battery 84 while electricity is stored in the battery 84. In other words, the battery-assisted tag 8 can be operated even when electricity generated by the electricity generating unit 73 is not the electricity that can operate the demodulating unit 72 and the control unit 86 or higher. This configuration is explained specifically using FIG. 16.

Figure 16:
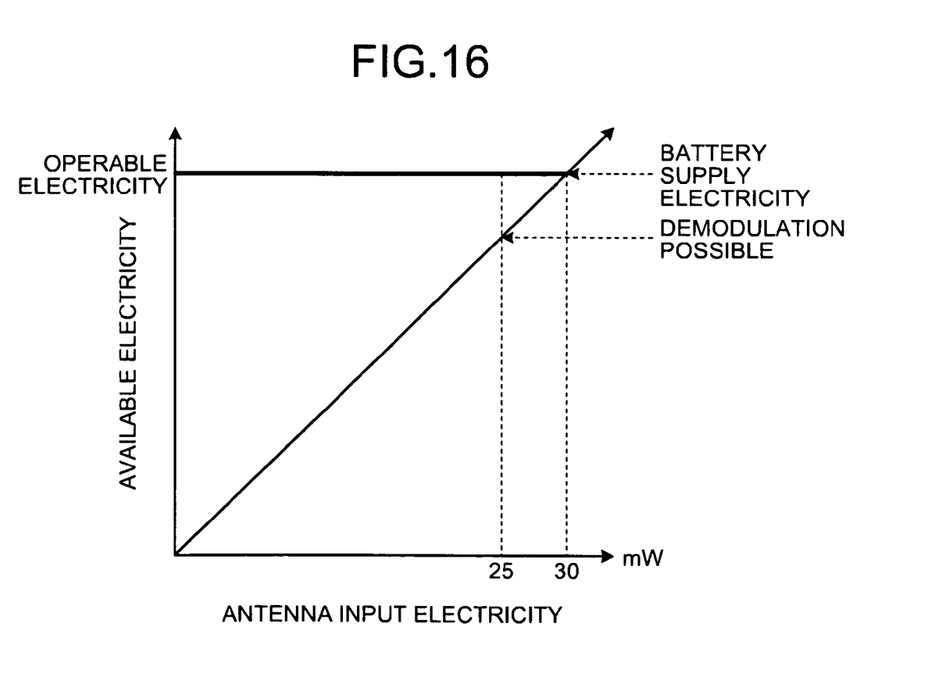
FIG. 16 is a graph of an example of relationship between the antenna input electricity and the available electricity of the battery-assisted tag shown in FIG. 15.

FIG. 16 is a graph of an example of relationship between the antenna input electricity and the available electricity of the battery-assisted tag 8 depicted in FIG. 15. It is assumed here that electricity is stored in the battery 84. As depicted in FIG. 16, electricity sufficient to operate the demodulating unit 72 and the like is supplied to the battery-assisted tag 8 from the battery 84 when electricity is stored in the battery 84. Accordingly, as depicted in FIG. 16, when the antenna input electricity is 25 milliwatts or higher, the demodulating unit 72 can demodulate radio waves, and thus the battery-assisted tag 8 can communicate with a reader/writer.

As can be seen, although the conventional passive tag 7 depicted in FIG. 13 cannot be operated unless it receives radio waves with the electricity of 30 milliwatts or higher, the battery-assisted tag 8 can be operated by receiving radio waves with the electricity of merely 25 milliwatts or higher. As a result, the battery-assisted tag 8 can lengthen the distance within which it can communicate with a reader/writer as compared with the conventional passive tag 7.

However, the communication distance improved by the battery-assisted tag 8 as compared with the conventional tag 7 is merely a difference between the distance within which radio waves with the electricity that enables demodulation can be received, and the distance within which radio waves with the electricity necessary in generating operable electricity can be received. While passive tags are used in various scenes in recent years, a passive tag that can further lengthen the communication distance is desired to be realized.

Figure 1:
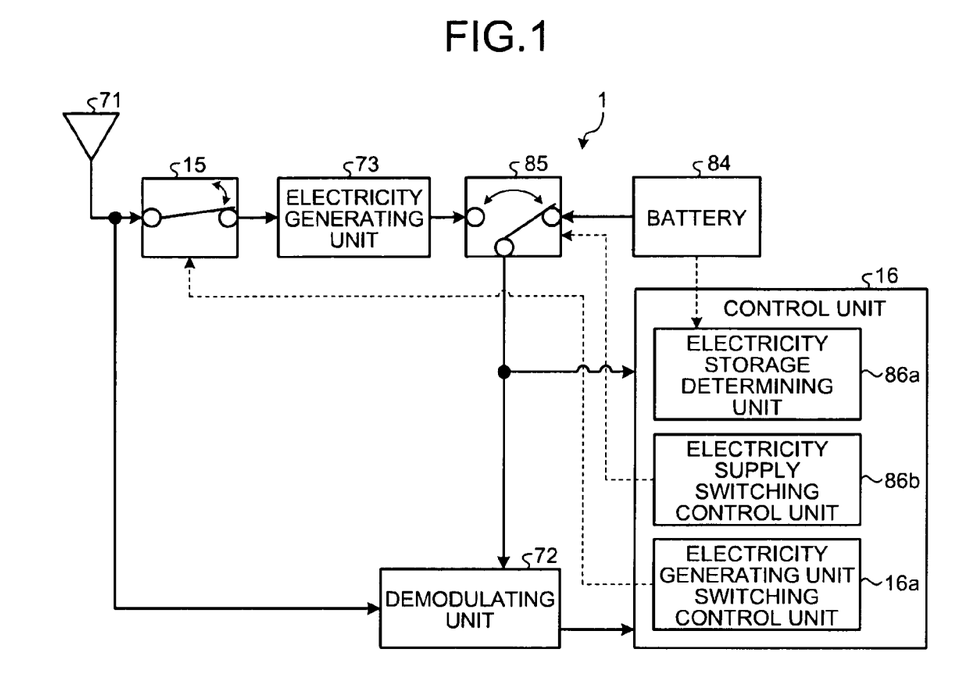
FIG. 1 is a schematic of a circuit for a battery-assisted tag according to a first embodiment of the present invention.

The passive tag according to the first embodiment can further lengthen communication distance than that of the battery-assisted tag 8. FIG. 1 is a schematic of a circuit for a battery-assisted tag 1 according to the first embodiment. As depicted in FIG. 1, the battery-assisted tag 1, compared with the battery-assisted tag 8 depicted in FIG. 15, includes a control unit 16 instead of the control unit 86, and an electricity generating unit selector 15 additionally.

The electricity generating unit selector 15 is a switch that selects a connection either to input or not to input the radio waves received by the antenna 71 to the electricity generating unit 73. When the electricity generating unit selector 15 selects a connection to input radio waves to the electricity generating unit 73, the ratio of electricity of radio waves output by the antenna 71 to the demodulating unit 72 and the electricity generating unit 73 is 2:3. On the other hand, when the electricity generating unit selector 15 selects a connection not to input radio waves to the electricity generating unit 73, the antenna 71 outputs all the received radio waves to the demodulating unit 72. For example, when the antenna 71 receives radio waves with the electricity of 10 milliwatts, radio waves with the electricity of 10 milliwatts are input to the demodulating unit 72.

The control unit 16, compared with the control unit 86 depicted in FIG. 15, includes an electricity generating unit switching control unit 16a additionally. The electricity generating unit switching control unit 16a is a processing unit that instructs the electricity generating unit selector 15 to select a connection based on the result of electricity storage determination processing by the electricity storage determining unit 86a.

Specifically, the electricity generating unit switching control unit 16a selects a connection of the electricity generating unit selector 15 not to input radio waves to the electricity generating unit 73 when the electricity storage determining unit 86a determines that electricity is stored in the battery 84. On the other hand, the electricity generating unit switching control unit 16a selects a connection of the electricity generating unit selector 15 to input radio waves to the electricity generating unit 73 when the electricity storage determining unit 86a determines that electricity is not stored in the battery 84.

Figure 2:
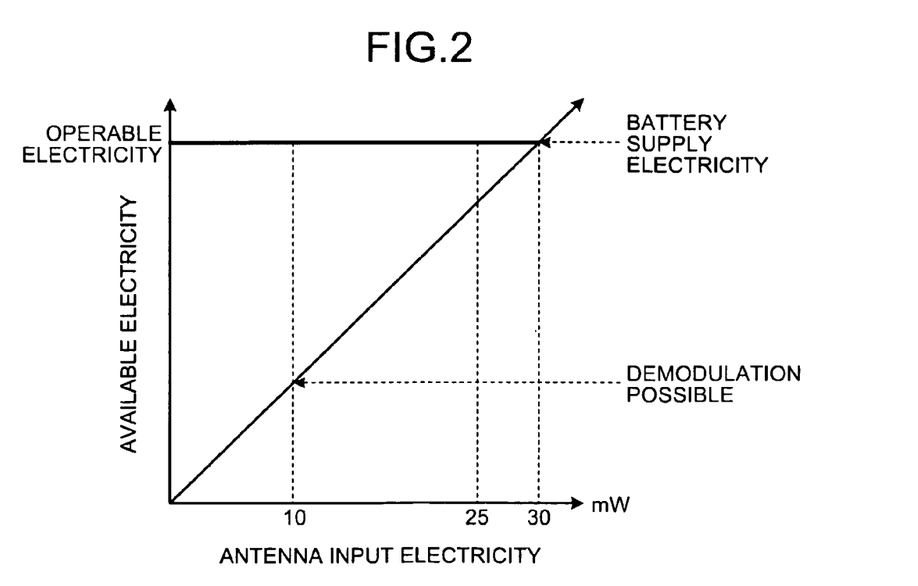
FIG. 2 is a graph of an example of relationship between antenna input electricity and the available electricity of the battery-assisted tag shown in FIG. 1.

Relationship between the antenna input electricity and the available electricity of the battery-assisted tag 1 depicted in FIG. 1 will now be explained. FIG. 2 is a graph of an example of the relationship between the antenna input electricity and the available electricity of the battery-assisted tag 1 depicted in FIG. 1. It is assumed here that electricity is stored in the battery 84.

As illustrated in FIG. 2, with the battery-assisted tag 1, the demodulating unit 72 can demodulate radio waves when the antenna input electricity reaches 10 milliwatts. This is because, as described above, all the radio waves received by the antenna 71 are input to the demodulating unit 72 when electricity is stored in the battery 84. In other words, when the antenna 71 receive radio waves with the electricity of 10 milliwatts, radio waves with the electricity of 10 milliwatts are input to the demodulating unit 72, and thus the demodulating unit 72 can demodulate the radio waves. The battery-assisted tag 1 can be operated by the electricity supplied from the battery 84, and thus can communicate with a reader/writer when the antenna input electricity is 10 milliwatts or higher.

Figure 3:
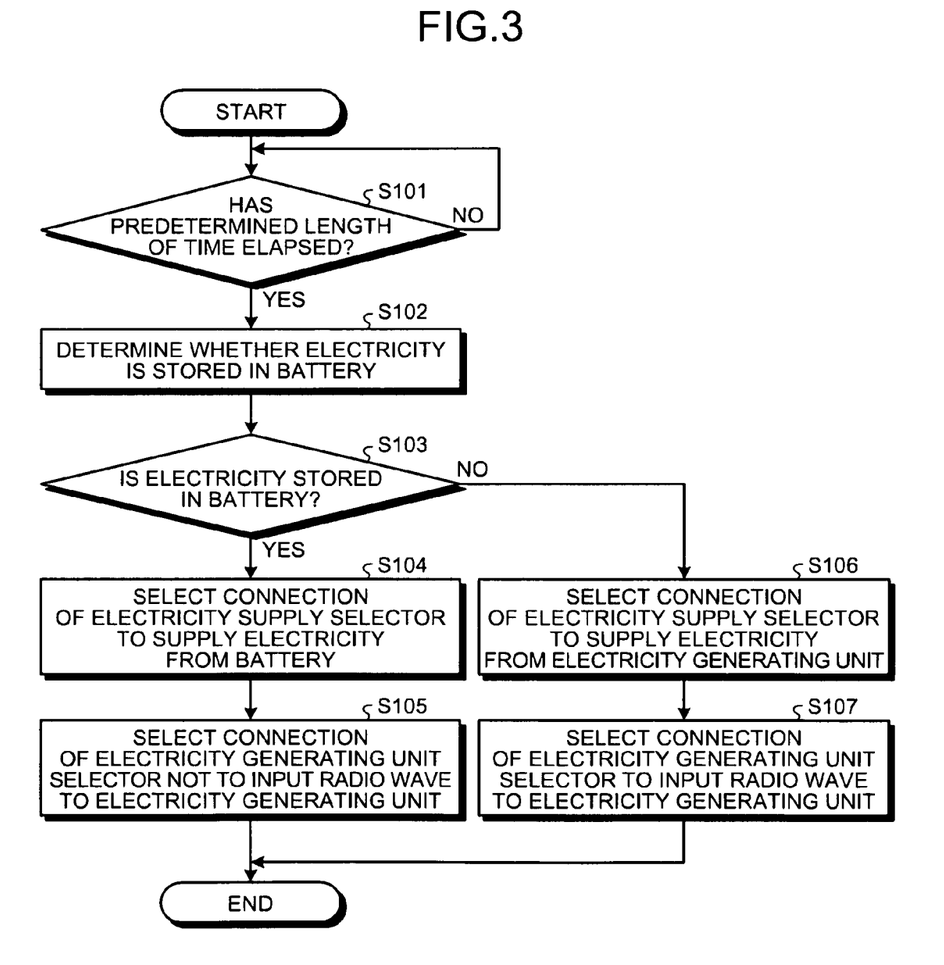
FIG. 3 is a flowchart of connection switching processing procedure by the battery-assisted tag according to the first embodiment.

Procedure of the connection switching processing by the battery-assisted tag 1 according to the first embodiment will now be explained. FIG. 3 is a flowchart of the connection switching processing procedure by the battery-assisted tag 1 according to the first embodiment. The processing procedure illustrated in FIG. 3 is performed regularly.

As depicted in FIG. 3, when a predetermined length of time has elapsed (Yes at Step S101), the electricity storage determining unit 86a of the battery-assisted tag 1 determines whether electricity is stored in the battery 84 (Step S102). The electricity storage determining unit 86a determines whether electricity is stored in the battery 84 each time a predetermined length of time elapses.

When the electricity storage determining unit 86a determines that electricity is stored in the battery 84 (Yes at Step S103), the electricity supply switching control unit 86b selects a connection of the electricity supply selector 85 to supply electricity from the battery 84 (Step S104). Then, the electricity generating unit switching control unit 16a selects a connection of the electricity generating unit selector 15 not to input radio wave to the electricity generating unit 73 (Step S105).

As can be seen, by switching the connection of the electricity supply selector 85 and the electricity generating unit selector 15, electricity is supplied to the demodulating unit 72 and the control unit 16 by the battery 84, and all the radio waves received by the antenna 71 are input to the demodulating unit 72. Accordingly, the battery-assisted tag 1 can communicate with a reader/writer while electricity is stored in the battery 84 even when the battery-assisted tag 1 receives radio waves with small electricity.

On the other hand, when the electricity storage determining unit 86a determines that electricity is not stored in the battery 84 (No at Step S103), the electricity supply switching control unit 86b selects a connection of the electricity supply selector 85 to supply electricity from the electricity generating unit 73 (Step S106). Then, the electricity generating unit switching control unit 16a selects a connection of the electricity generating unit selector 15 to input radio wave to the electricity generating unit 73 (Step S107).

As can be seen, by switching the connection of the electricity supply selector 85 and the electricity generating unit selector 15, electricity is supplied to the demodulating unit 72 and the control unit 16 by the electricity generating unit 73, and radio waves received by the antenna 71 are input to the electricity generating unit 73 and the demodulating unit 72. Accordingly, the battery-assisted tag 1 can be operated similarly to the conventional passive tag even when electricity stored in the battery 84 is consumed.

As described above, the battery-assisted tag 1 according to the first embodiment is configured to select a connection to supply operating electricity by the battery 84, and select a connection not to input radio waves received by the antenna 71 to the electricity generating unit 73 when electricity is stored in the battery 84, and thus can communicate with a reader/writer even when the battery-assisted tag 1 receives radio waves with small electricity. As a result, the battery-assisted tag 1 according to the first embodiment can lengthen the distance within which the battery-assisted tag 1 can communicate with a reader/writer as compared with the conventional passive tag 7 and the conventional battery-assisted tag 8.

The battery-assisted tag 1 according to the first embodiment is configured to select a connection to supply operating electricity from the electricity generating unit 73, and select a connection to input radio waves received by the antenna 71 to the electricity generating unit 73 when electricity is not stored in the battery 84, and thus can be operated similarly to the conventional passive tag even when electricity stored in the battery 84 is consumed.

[b] Second Embodiment

While in the first embodiment an example in which electricity of radio waves input to the demodulating unit 72 is increased by switching the connection by the electricity generating unit selector 15 is shown, electricity of radio waves input to the demodulating unit 72 may be increased by amplifying radio waves received by the antenna 71. In a second embodiment, an example in which radio waves received by the antenna 71 are amplified is explained.

Figure 4:
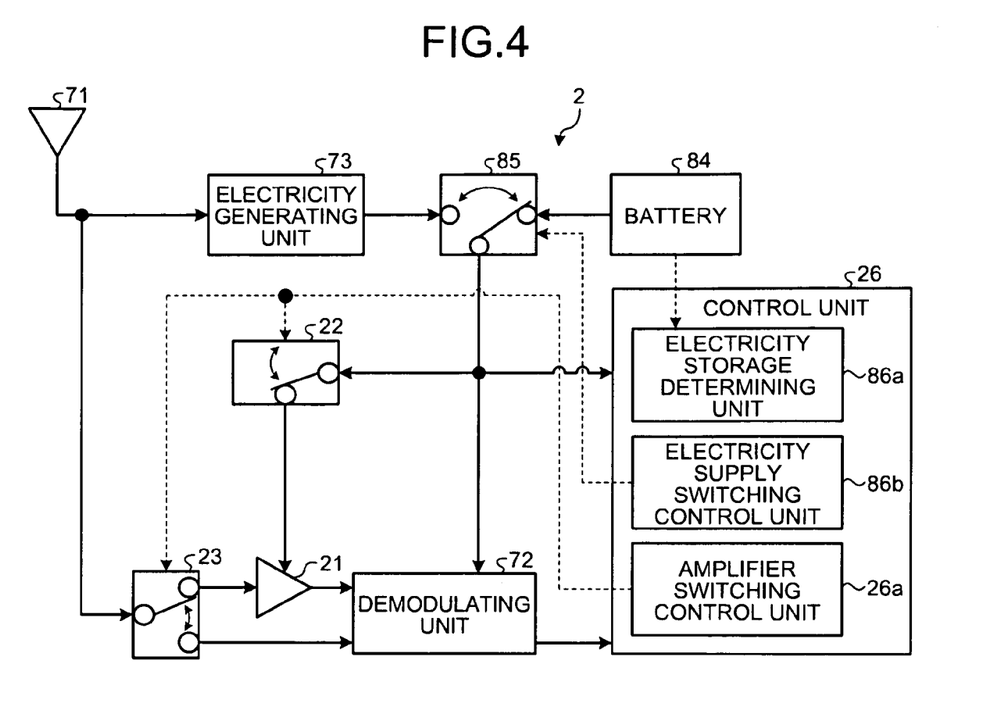
FIG. 4 is a schematic of a circuit for a battery-assisted tag according to a second embodiment of the present invention.

FIG. 4 is a schematic of a circuit for a battery-assisted tag 2 according to the second embodiment. As depicted in FIG. 4, the battery-assisted tag 2 includes a radio wave input selector 23 and a control unit 26 instead of the electricity generating unit selector 15 and the control unit 16 that the battery-assisted tag 1 depicted in FIG. 1 includes, and includes an amplifier 21 and an amplifier selector 22 additionally.

The amplifier 21 is a circuit that amplifies electricity of input radio waves and outputs the electricity to the demodulating unit 72. In the present embodiment, it is assumed that the amplifier 21 amplifies electricity 2.5-fold. The amplifier selector 22 is a switch that selects a connection either to input or not to input electricity supplied from the electricity generating unit 73 or the battery 84 to the amplifier 21. The radio wave input selector 23 is a switch that selects a connection to input radio waves received by the antenna 71 to the demodulating unit 72 either through or bypassing the amplifier 21.

The control unit 26 has an amplifier switching control unit 26a instead of the electricity generating unit switching control unit 16a as compared with the control unit 16 depicted in FIG. 1. The amplifier switching control unit 26a is a processing unit that instructs the amplifier selector 22 and the radio wave input selector 23 to select a connection based on the result of electricity storage determination by the electricity storage determining unit 86a.

Specifically, the amplifier switching control unit 26a selects a connection of the amplifier selector 22 to supply electricity to the amplifier 21 from the battery 84 when the electricity storage determining unit 86a determines that electricity is stored in the battery 84, and selects a connection of the radio wave input selector 23 to input radio waves received by the antenna 71 to the demodulating unit 72 through the amplifier 21.

On the other hand, the amplifier switching control unit 26a selects a connection of the amplifier selector 22 not to supply electricity to the amplifier 21 from the electricity generating unit 73 when the electricity storage determining unit 86a determines that electricity is not stored in the battery 84, and selects a connection of the radio wave input selector 23 to input radio waves received by the antenna 71 bypassing the amplifier 21. In this way, when electricity is not stored in the battery 84, electricity is not supplied to the unused amplifier 21, and thus it becomes possible to decrease electricity consumption.

Figure 5:
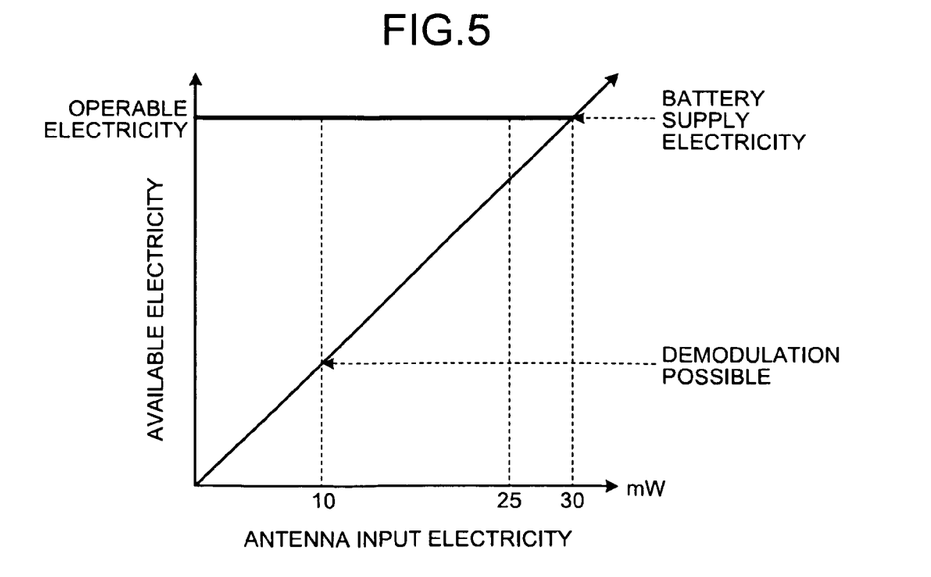
FIG. 5 is a graph of an example of relationship between antenna input electricity and the available electricity of the battery-assisted tag shown in FIG. 4.

Relationship between the antenna input electricity and the available electricity of the battery-assisted tag 2 depicted in FIG. 4 will now be explained. FIG. 5 is a graph of an example of the relationship between the antenna input electricity and the available electricity of the battery-assisted tag 2 depicted in FIG. 4. It is assumed here that electricity is stored in the battery 84.

As illustrated in FIG. 5, in the battery-assisted tag 2, when the antenna input electricity reaches 10 milliwatts, the demodulating unit 72 can demodulate radio waves. This is because, as described above, when electricity is stored in the battery 84, radio waves received by the antenna 71 are amplified, and input to the demodulating unit 72. In other words, when the antenna 71 receives radio waves with the electricity of 10 milliwatts, radio waves with the electricity of 4 milliwatts are input to the amplifier 21. The amplifier 21 amplifies the input radio waves to 10 milliwatts, and inputs the radio waves to the demodulating unit 72. Accordingly, the demodulating unit 72 can demodulate the radio waves. The battery-assisted tag 2 can be operated with electricity supplied from the battery 84, and thus can communicate with a reader/writer when the antenna input electricity is 10 milliwatts or higher.

The gain of the amplifier 21 is merely an example, and strength of radio waves with which the battery-assisted tag 2 can be operated changes depending on the gain of the amplifier 21.

Figure 6:
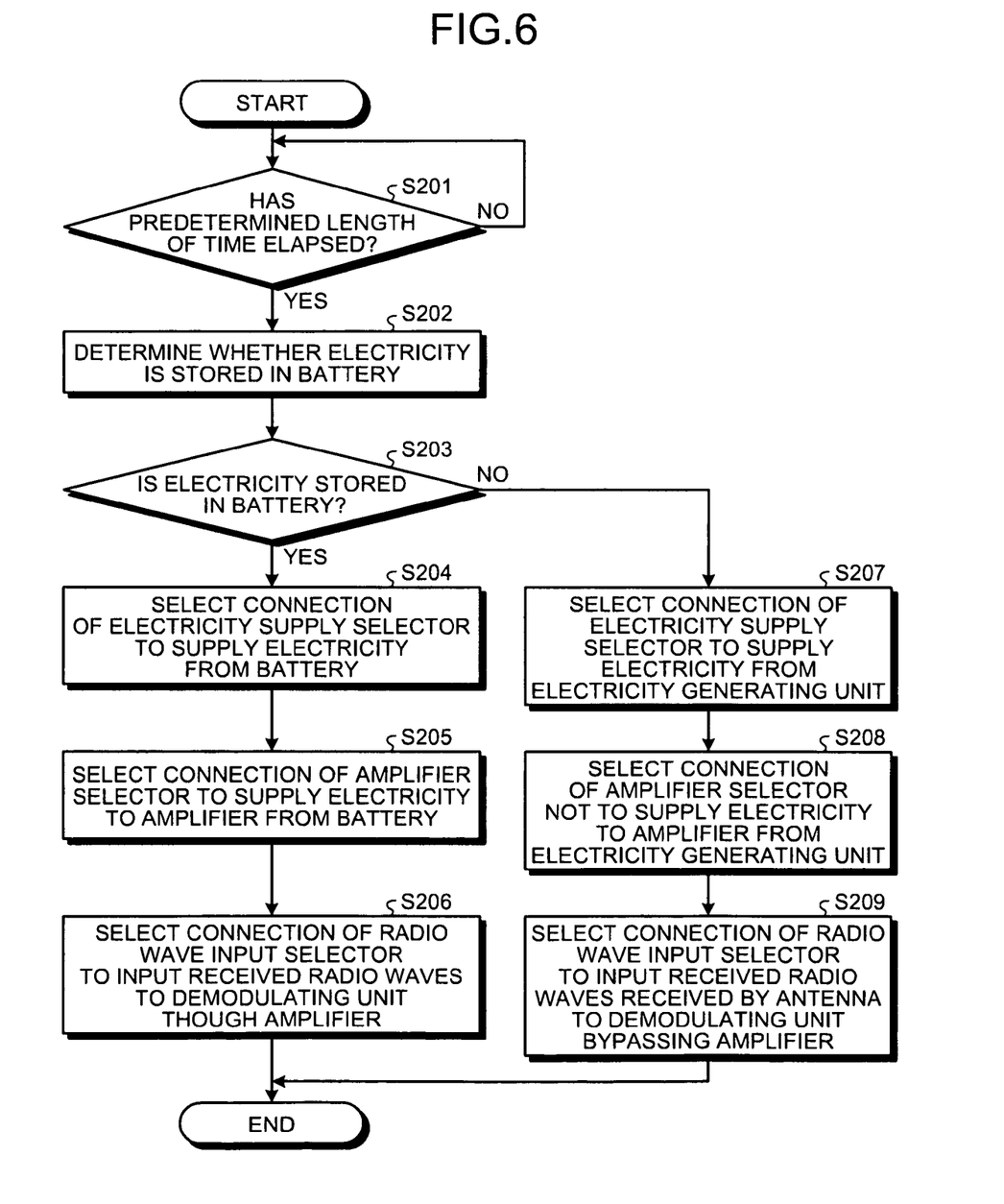
FIG. 6 is a flowchart of connection switching processing procedure by the battery-assisted tag according to the second embodiment.

Procedure of the connection switching processing by the battery-assisted tag 2 according to the second embodiment will now be explained. FIG. 6 is a flowchart of the connection switching processing procedure by the battery-assisted tag 2 according to the second embodiment. The processing procedure illustrated in FIG. 6 is performed regularly. In the following, processing procedure that is the same with the processing procedure illustrated in FIG. 3 is not explained.

As illustrated in FIG. 6, when the electricity storage determining unit 86a determines that electricity is stored in the battery 84 (Yes at Step S203), the electricity supply switching control unit 86b of the battery-assisted tag 2 selects a connection of the electricity supply selector 85 to supply electricity from the battery 84 (Step S204).

Then, the amplifier switching control unit 26a selects a connection of the amplifier selector 22 to supply electricity to the amplifier 21 from the battery 84 (Step S205). Then, the amplifier switching control unit 26a selects a connection of the radio wave input selector 23 to input radio waves received by the antenna 71 to the demodulating unit 72 though the amplifier 21 (Step S206).

On the other hand, when the electricity storage determining unit 86a determines that electricity is not stored in the battery 84 (No at Step S203), the electricity supply switching control unit 86b selects a connection of the electricity supply selector 85 to supply electricity from the electricity generating unit 73 (Step S207).

Then, the amplifier switching control unit 26a selects a connection of the amplifier selector 22 not to supply electricity to the amplifier 21 from the electricity generating unit 73 (Step S208). Then, the amplifier switching control unit 26a selects a connection of the radio wave input selector 23 to input radio waves received by the antenna 71 to the demodulating unit 72 bypassing the amplifier 21 (Step S209).

As described above, the battery-assisted tag 2 according to the second embodiment is configured to switch connection to supply operating electricity from the battery 84, and switch connection of the radio wave input selector 23 to input radio waves received by the antenna 71 to the demodulating unit 72 through the amplifier 21 when electricity is stored in the battery 84, and thus can communicate with a reader/writer even when the battery-assisted tag 2 receives radio waves with small electricity. As a result, the battery-assisted tag 2 according to the second embodiment can lengthen the distance within which the battery-assisted tag 2 can communicate with a reader/writer as compared with the conventional passive tag 7 and the conventional battery-assisted tag 8.

The battery-assisted tag 2 according to the second embodiment is configured to switch connection to supply operating electricity from the electricity generating unit 73, and switch connection of the radio wave input selector 23 to input radio waves received by the antenna 71 bypassing the amplifier 21 when electricity is not stored in the battery 84, and thus can be operated similarly to the conventional passive tag even when electricity stored in the battery 84 is consumed.

[c] Third Embodiment

The configurations of the battery-assisted tags 1 and 2 described in the first and the second embodiments may be combined. In a third embodiment, an example of combining the configurations of the battery-assisted tags 1 and 2 described in the first and the second embodiments is explained.

Figure 7:
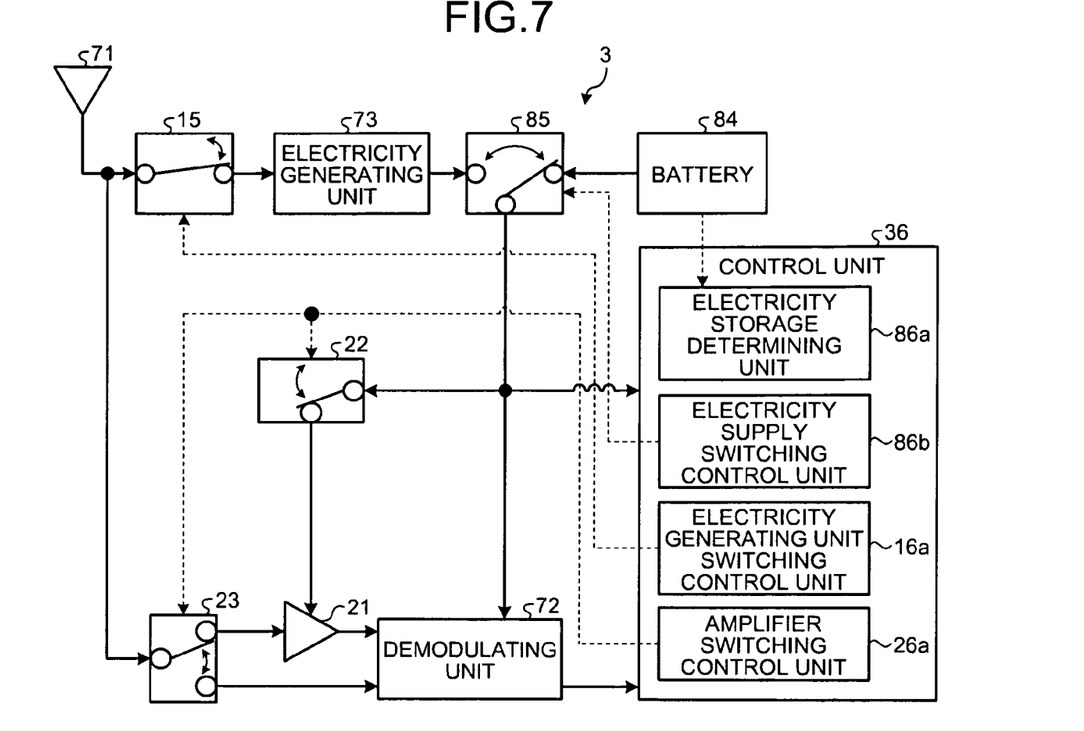
FIG. 7 is a schematic of a circuit for a battery-assisted tag according to a third embodiment of the present invention.

FIG. 7 is a schematic of a circuit for a battery-assisted tag 3 according to the third embodiment. As depicted in FIG. 7, the battery-assisted tag 3 includes the antenna 71, the demodulating unit 72, the electricity generating unit 73, the battery 84, the electricity supply selector 85, the electricity generating unit selector 15, the amplifier 21, the amplifier selector 22, the radio wave input selector 23, and a control unit 36. The control unit 36 includes the electricity storage determining unit 86a, the electricity supply switching control unit 86b, the electricity generating unit switching control unit 16a, and the amplifier switching control unit 26a.

Figure 8:
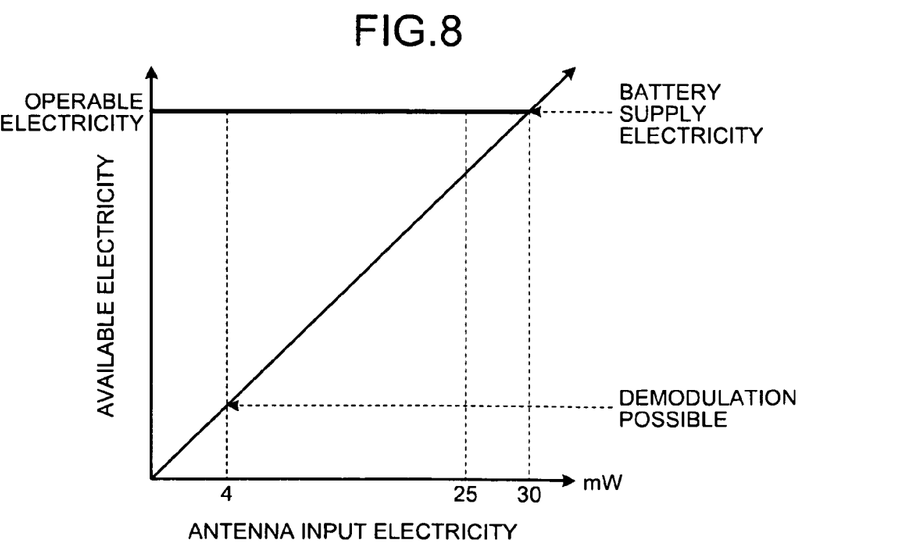
FIG. 8 is a graph of an example of relationship between the antenna input electricity and the available electricity of the battery-assisted tag shown in FIG. 7.

With this configuration, the battery-assisted tag 3 according to the third embodiment can be operated even when the electricity of radio waves received by the antenna 71 is small. This is explained specifically using FIG. 8. FIG. 8 is a graph of an example of relationship between the antenna input electricity and the available electricity of the battery-assisted tag 3 depicted in FIG. 7. It is assumed here that electricity is stored in the battery 84.

As depicted in FIG. 8, in the battery-assisted tag 3, when the antenna input electricity reaches 4 milliwatts, the demodulating unit 72 can demodulate radio waves. This is because when electricity is stored in the battery 84, the electricity generating unit switching control unit 16a selects a connection of the electricity generating unit selector 15 not to input radio waves to the electricity generating unit 73, and the amplifier switching control unit 26a selects a connection of the radio wave input selector 23 to input radio waves received by the antenna 71 to the demodulating unit 72 through the amplifier 21.

Accordingly, all the radio waves received by the antenna 71 are input to the demodulating unit 72, and the radio waves are amplified, and input to the demodulating unit 72. In other words, when the antenna 71 receives radio waves with the electricity of 4 milliwatts, radio waves with the electricity of 4 milliwatts are input to the amplifier 21. The amplifier 21 amplifies the electricity of the input radio waves to 10 milliwatts, and inputs the radio waves to the demodulating unit 72. Accordingly, the demodulating unit 72 can demodulate the radio waves. The battery-assisted tag 3 can be operated with the electricity supplied from the battery 84, and thus can communicate with a reader/writer when the antenna input electricity is 4 milliwatts or higher.

Figure 9:
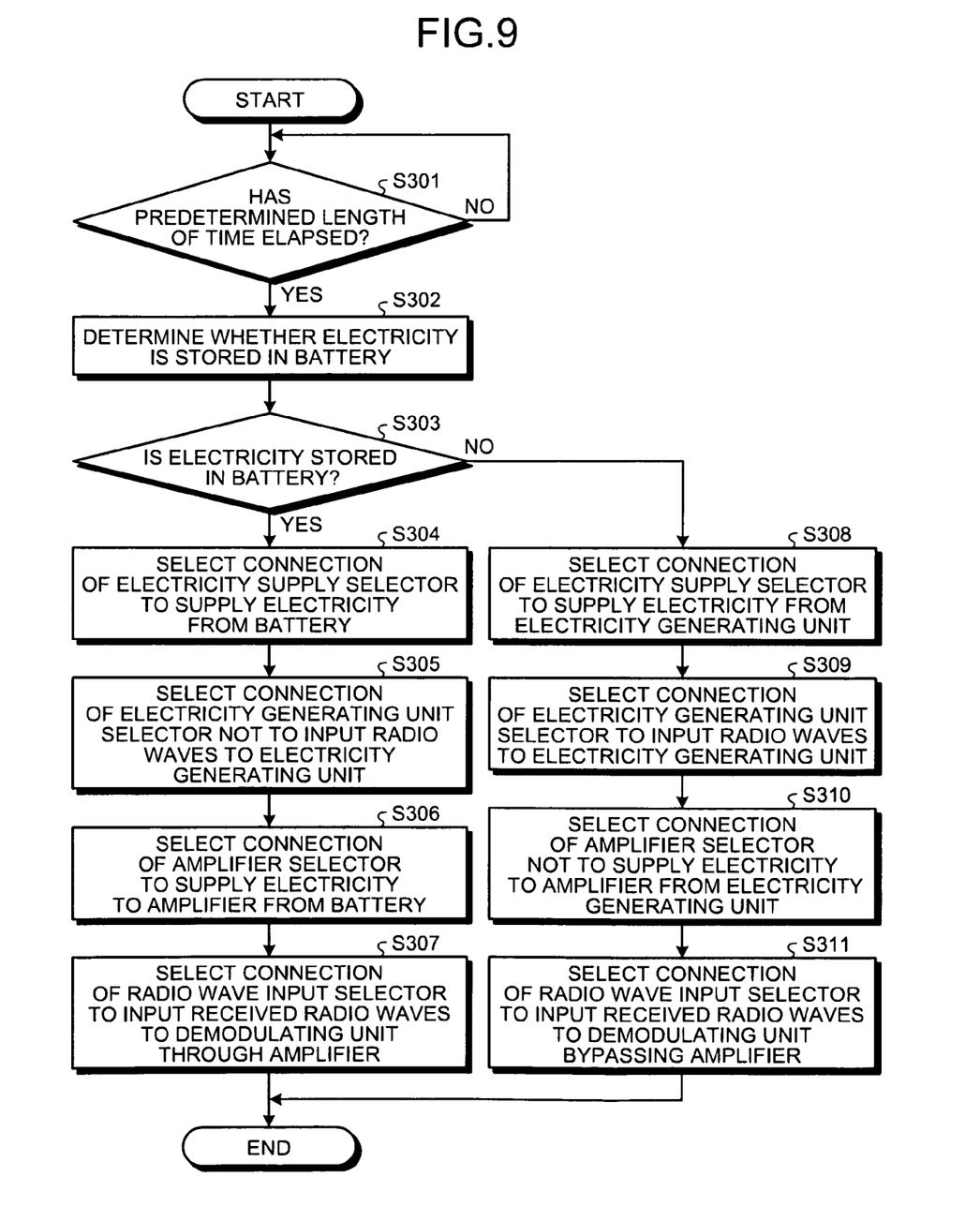
FIG. 9 is a flowchart of connection switching processing procedure by the battery-assisted tag according to the third embodiment.

The procedure of connection switching processing by the battery-assisted tag 3 according to the third embodiment will now be explained. FIG. 9 is a flowchart of the connection switching processing procedure by the battery-assisted tag 3 according to the third embodiment. The processing procedure illustrated in FIG. 9 is performed regularly.

As depicted in FIG. 9, when the electricity storage determining unit 86a determines that electricity is stored in the battery 84 (Yes at Step S303), the electricity supply switching control unit 86b of the battery-assisted tag 3 selects a connection of the electricity supply selector 85 to supply electricity from the battery 84 (Step S304). Then, the electricity generating unit switching control unit 16a selects a connection of the electricity generating unit selector 15 not to input radio waves to the electricity generating unit 73 (Step S305).

Then, the amplifier switching control unit 26a selects a connection of the amplifier selector 22 to supply electricity to the amplifier 21 from the battery 84 (Step S306). Then, the amplifier switching control unit 26a selects a connection of the radio wave input selector 23 to input radio waves received by the antenna 71 to the demodulating unit 72 though the amplifier 21 (Step S307).

On the other hand, when the electricity storage determining unit 86a determines that electricity is not stored in the battery 84 (No at Step S303), the electricity supply switching control unit 86b selects a connection of the electricity supply selector 85 to supply electricity from the electricity generating unit 73 (Step S308). Then, the electricity generating unit switching control unit 16a selects a connection of the electricity generating unit selector 15 to input radio waves to the electricity generating unit 73 (Step S309).

Then, the amplifier switching control unit 26a selects a connection of the amplifier selector 22 not to supply electricity to the amplifier 21 from the electricity generating unit 73 (Step S310). Then, the amplifier switching control unit 26a selects a connection of the radio wave input selector 23 to input radio waves received by the antenna 71 to the demodulating unit 72 bypassing the amplifier 21 (Step S311).

As described above, the battery-assisted tag 3 according to the third embodiment is configured to select a connection to supply operating electricity from the battery 84, select a connection not to input radio waves received by the antenna 71 to the electricity generating unit 73, and select a connection of the radio wave input selector 23 to input radio waves received by the antenna 71 to the demodulating unit 72 through the amplifier 21 when electricity is stored in the battery 84, and thus can further lengthen the distance within which the battery-assisted tag 3 can communicate with a reader/writer.

The battery-assisted tag 3 according to the third embodiment is configured to select a connection to supply operating electricity from the electricity generating unit 73, select a connection to input radio waves received by the antenna 71 to the electricity generating unit 73, and select a connection of the radio wave input selector 23 to input radio waves received by the antenna 71 to the demodulating unit 72 bypassing the amplifier 21 when electricity is not stored in the battery 84, and thus the battery-assisted tag 3 can be operated similarly to the conventional passive tag even when electricity stored in the battery 84 is consumed.

[d] Fourth Embodiment

While in the first and the third embodiments examples in which the electricity generating unit selector 15 is provided for selecting either to input or not to input radio waves to the electricity generating unit 73 are described, a send backscatter switch may be used. In a fourth embodiment, an example in which connection is selected either to input or not to input radio waves to the electricity generating unit 73 using a send backscatter switch will be explained.

Figure 10:
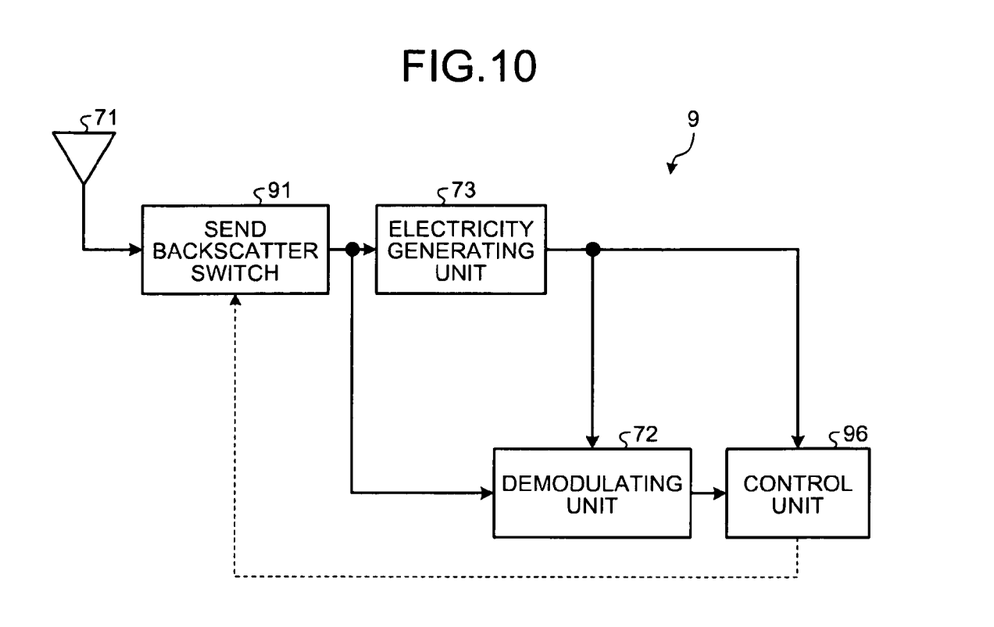
FIG. 10 is a schematic of a circuit for a conventional passive tag including a send backscatter switch.

First, a conventional passive tag 9 including a send backscatter switch will be explained. FIG. 10 is a schematic of a circuit for the conventional passive tag 9 including a send backscatter switch. As depicted in FIG. 10, the passive tag 9 communicates with a reader/writer using a system called backscatter, and includes the antenna 71, the demodulating unit 72, the electricity generating unit 73, a send backscatter switch 91, and a control unit 96.

When the passive tag 9 receives radio waves from a reader/writer, the send backscatter switch 91 sends reflected waves of the received radio waves to the reader/writer. Specifically, as in the state illustrated in FIG. 10, when connection of the send backscatter switch 91 is switched, the impedance of the antenna 71 and the impedance of the passive tag 9 match with each other. When the passive tag 9 receives radio waves from the reader/writer, and sends reflected waves of the received radio wave to the reader/writer, the control unit 96 makes connection of the send backscatter switch 91 switched, and makes the impedance of the antenna 71 and the impedance of the passive tag 9 unmatched. In this way, the passive tag 9 sends reflected waves of received radio waves to the reader/writer.

The send backscatter switch 91 is used only when the passive tag 9 sends reflected waves to a reader/writer. In the fourth embodiment, the send backscatter switch 91 is used in sending reflected waves, and in selecting connection either to input or not to input received radio waves to the electricity generating unit 73.

Figure 11:
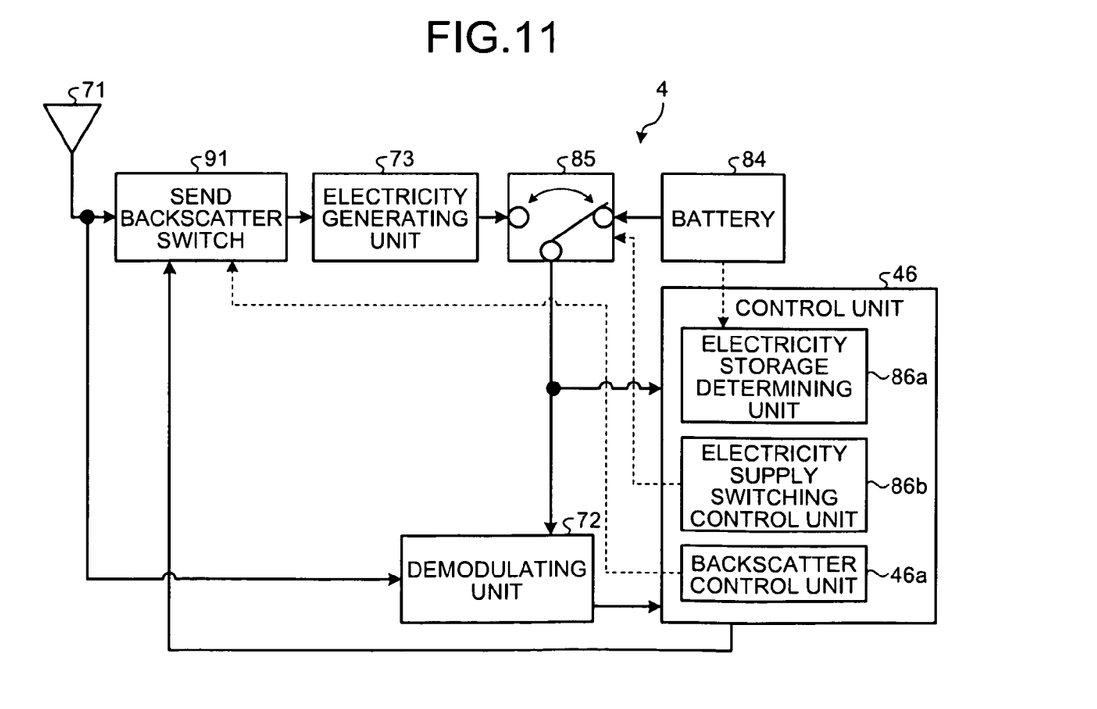
FIG. 11 is a schematic of a circuit for a battery-assisted tag according to a fourth embodiment of the present invention.

FIG. 11 is a schematic of a circuit for a battery-assisted tag 4 according to the fourth embodiment. As depicted in FIG. 11, the battery-assisted tag 4 includes the send backscatter switch 91 and a control unit 46 instead of the electricity generating unit selector 15 and the control unit 16 as compared with the battery-assisted tag 1 depicted in FIG. 1.

The control unit 46 includes a backscatter control unit 46a instead of the electricity generating unit switching control unit 16a as compared with the control unit 16 depicted in FIG. 1. When the battery-assisted tag 4 receives radio waves from a reader/writer, the backscatter control unit 46a selects a connection of the send backscatter switch 91 either to input or not to input radio waves received by the antenna 71 to the electricity generating unit 73. On the other hand, when the backscatter control unit 46a sends reflected waves to the reader/writer, the backscatter control unit 46a selects a connection of the send backscatter switch 91 to make the impedance of the antenna 71 and the impedance of the passive tag 9 unmatched.

As described above, the battery-assisted tag 4 according to the fourth embodiment is configured to use the send backscatter switch 91 for selecting connection either to input or not to input received radio waves to the electricity generating unit 73, and thus can lengthen the distance within which the battery-assisted tag 4 can communicate with a reader/writer as compared with the conventional passive tag 7 and the conventional battery-assisted tag 8 without increasing the circuit size.

Figure 12:
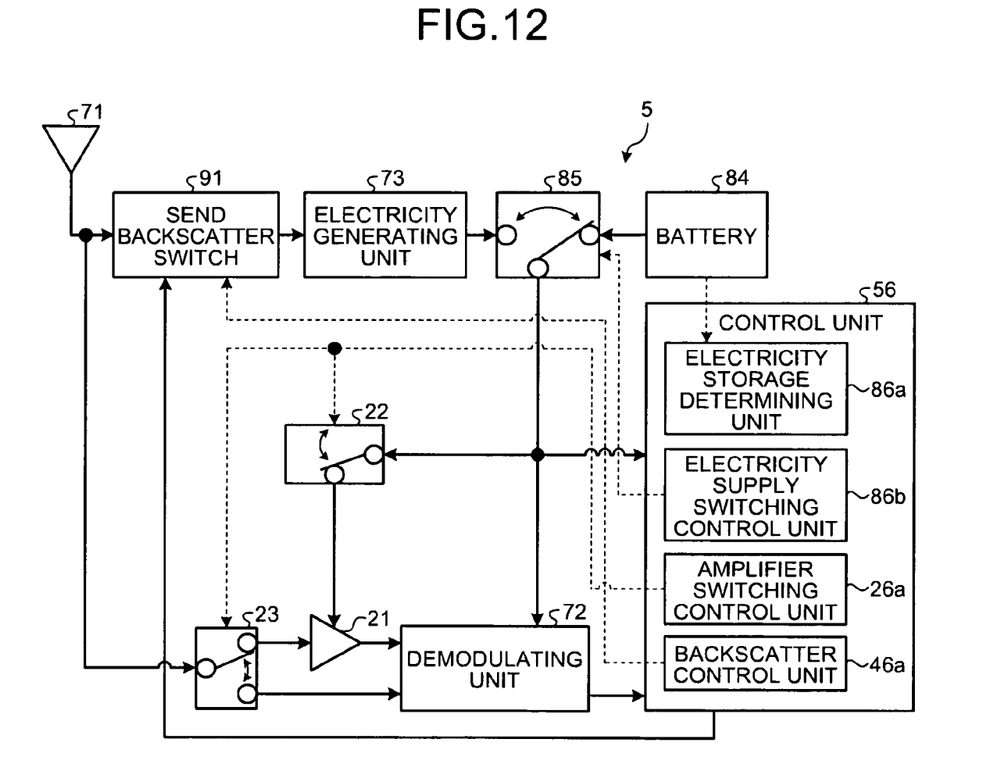
FIG. 12 is a schematic of a circuit for a battery-assisted tag including a send backscatter switch instead of an electricity generating unit selector that the battery-assisted tag shown in FIG. 7 includes.

Although in the description above, an example in which the send backscatter switch 91 is used instead of the electricity generating unit selector 15 that the battery-assisted tag 1 depicted in FIG. 1 includes has been shown, the send backscatter switch 91 may be used instead of the electricity generating unit selector 15 in the battery-assisted tag 3 depicted in FIG. 7. FIG. 12 is a schematic of a circuit for a battery-assisted tag 5 including the send backscatter switch 91 instead of the electricity generating unit selector 15 that the battery-assisted tag 3 depicted in FIG. 7 includes. As depicted in FIG. 12, the battery-assisted tag 5 includes the send backscatter switch 91 and a control unit 56 instead of the electricity generating unit selector 15 and the control unit 36 as compared with the battery-assisted tag 3 depicted in FIG. 7. The battery-assisted tag 5 can lengthen the distance within which the battery-assisted tag 5 can communicate with a reader/writer without increasing the circuit size as compared with the battery-assisted tag 3 depicted in FIG. 7.

An RFID tag according to the embodiment provides an effect of lengthening the distance within which the RFID tag can communicate with a reader/writer as compared with a conventional RFID tag.

The components or expression of the RFID tag disclosed in the present application, or any combinations of the components may be applied to a method, an apparatus, a system, a computer program, a recording medium, or a data structure, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio-frequency identification (RFID) tag comprising:
   a battery that stores therein electricity and supplies the electricity to the RFID tag;
   an antenna that receives radio waves transmitted from a reader/writer;
   a demodulating unit that demodulates the radio waves received by the antenna;
   an electricity generating unit that generates electricity based on the radio waves received by the antenna, and supplies the electricity to the RFID tag;
   an electricity storage determining unit that determines whether electricity is stored in the battery;
   an electricity supply switching control unit that, when the electricity storage determining unit determines that electricity is stored in the battery, selects a connection of a circuit to operate the RFID tag with the electricity supplied from the battery; and
   an electricity generating unit switching control unit that, when the electricity storage determining unit determines that electricity is stored in the battery, selects a connection of a circuit to input all the radio waves received by the antenna to the demodulating unit by switching connection of a send backscatter switch used for sending reflected waves to a reader/writer.

2. The RFID tag according to claim 1, wherein
   when the electricity storage determining unit determines that electricity is not stored, the electricity supply switching control unit selects a connection of a circuit to operate the RFID tag with the electricity supplied from the electricity generating unit, and
   when the electricity storage determining unit determines that electricity is not stored, the electricity generating unit switching control unit selects a connection of a circuit to input the radio waves received by the antenna to the electricity generating unit.

3. A radio-frequency identification (RFID) tag comprising:
   a battery that stores therein electricity and supplies the electricity to the RFID tag;
   an antenna that receives radio waves transmitted from a reader/writer;
   a demodulating unit that demodulates the radio waves received by the antenna;
   an electricity generating unit that generates electricity based on the radio waves received by the antenna, and supplies the electricity to the RFID tag;
   an amplifier that amplifies the radio waves received by the antenna, and inputs resultant radio waves to the demodulating unit;
   an electricity storage determining unit that determines whether electricity is stored in the battery;
   an electricity supply switching control unit that, when the electricity storage determining unit determines that electricity is stored in the battery, selects a connection of a circuit to operate the RFID tag with the electricity supplied from the battery; and
   an amplifier switching control unit that, when the electricity storage determining unit determines that electricity is stored in the battery, selects a connection of a circuit to input the radio waves received by the antenna to the demodulating unit through the amplifier and selects a connection of a circuit to supply electricity to the amplifier from the battery.

4. The RFID tag according to claim 3, further comprising an electricity generating unit switching control unit that, when the electricity storage determining unit determines that electricity is stored, selects a connection of a circuit not to input the radio waves received by the antenna to the electricity generating unit.

5. The RFID tag according to claim 4, wherein when the electricity storage determining unit determines that electricity is not stored, the electricity generating unit switching control unit selects a connection of a circuit to input the radio waves received by the antenna to the electricity generating unit.

6. The RFID tag according to claim 3, wherein
   when the electricity storage determining unit determines that electricity is not stored, the electricity supply switching control unit selects a connection of a circuit to operate the RFID tag with electricity supplied from the electricity generating unit, and
   when the electricity storage determining unit determines that electricity is not stored, the amplifier switching control unit selects a connection of a circuit to input the radio waves received by the antenna to the demodulating unit bypassing the amplifier, and selects a connection of a circuit not to supply electricity to the amplifier from the electricity generating unit.

7. The RFID tag according to claim 4, wherein the electricity generating unit switching control unit selects whether to input the radio waves received by the antenna to the electricity generating unit by switching connection of a send backscatter switch.

* * * * *